(12) United States Patent
Park

(10) Patent No.: US 6,336,678 B1
(45) Date of Patent: Jan. 8, 2002

(54) VEHICLE HATCH DISMANTLING DEVICE

(75) Inventor: Dae-Sung Park, Chollabuk-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/698,844

(22) Filed: Oct. 27, 2000

(30) Foreign Application Priority Data

Oct. 27, 1999 (KR) .......................................... 99-46853

(51) Int. Cl.$^7$ ................................................ B60J 7/043
(52) U.S. Cl. .................... 296/216.02; 296/224; 49/141; 292/DIG. 5; 292/DIG. 65
(58) Field of Search ................................. 296/223, 218, 296/224, 216.02; 292/DIG. 5, DIG. 65; 49/141, 394

(56) References Cited

FOREIGN PATENT DOCUMENTS

| EP | 94257 | * 11/1983 | .................. 296/224 |
|---|---|---|---|
| FR | 2616474 | * 12/1988 | .................. 296/224 |
| GB | 881147 | * 11/1961 | .................. 49/141 |

* cited by examiner

*Primary Examiner*—Dennis H. Pedder
(74) *Attorney, Agent, or Firm*—Christie, Parker & Hale, LLP

(57) ABSTRACT

A vehicle hatch dismantling device adapted to fix a hatch to allow an opening at the roof to be opened and closed for ventilation in normal times and to enable an easy detachment of the hatch in emergency such as overturn or submergence of the vehicle, making it easy for passengers to escape through the opening at the roof of the vehicle, the device having a hatch for covering an opening at the roof, a first bracket coupled to a panel underneath the hatch for vertical movement of the hatch and a toggle link mechanism secured to an area between an inner wall surface of the opening and a second bracket, the device comprising: a plurality of clamping members coupled to the first bracket for coupling the first bracket to a lower panel of a hatch; an intermittent fixing member slidably disposed at an upper side of the lower panel and coupled to the clamping member for releaseably mounting the hatch to the first bracket; and an insertion hole formed at the lower panel for allowing the clamping member to be inserted into the hatch therethrough.

4 Claims, 6 Drawing Sheets

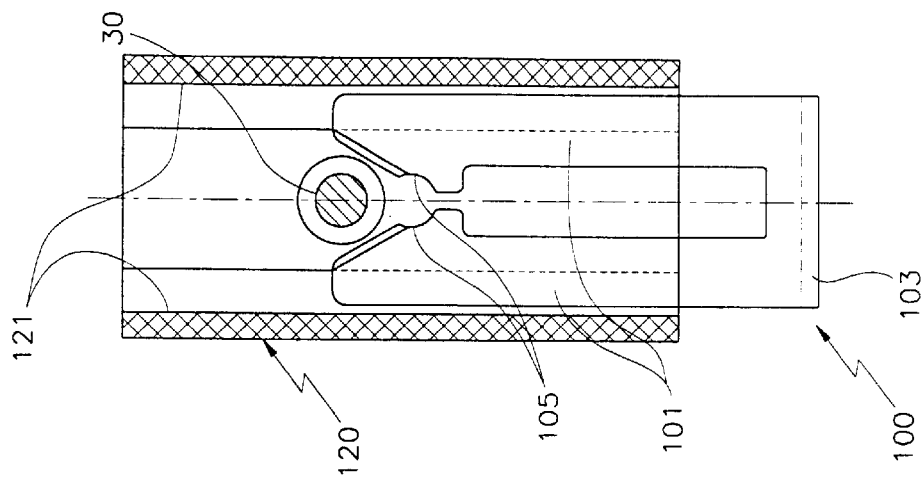
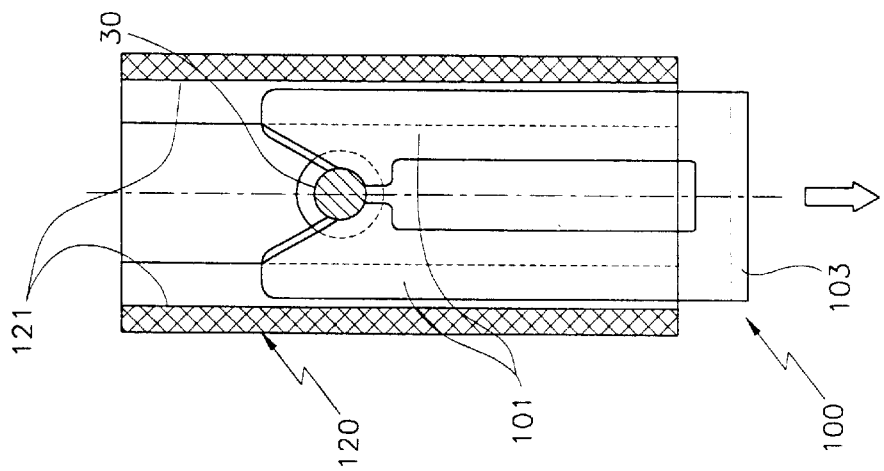

VEHICLE HATCH DISMANTLING DEVICE

BACKGROUND OF THE INVENTION

1. Field of the Invention

The present invention relates to a vehicle hatch dismantling device, more particularly to a device for dismantling a hatch covering an opening formed at a vehicle roof in emergency.

2. Description of the Prior Art

Generally, an emergency hatch 10 of a vehicle, as shown in FIGS. 1 and 2, is hinged to cover an opening 3 provided at the roof 1 of a vehicle. The hatch 10 is supported by a rectangle-shaped hatch support member 19 arranged in an inner wall of the opening 3. The hatch 10 is also coupled to a toggle link mechanism 20 for linking the hatch 10 to the hatch support member 19 to allow the hatch 10 to tilt to forward or backward direction, such that the hatch 10 can open and close the opening 3.

In other words, the hatch 10 is defined by a first bracket 5 fixed underneath the hatch 10 for vertically moving the hatch 10 and the toggle link mechanism 20 formed between an inner wall surface of the opening 3 and a second bracket 7 fixed to the hatch support member 19.

The second bracket 7 is clamped at the hatch support member 19 and the inner wall surface of the opening 3 by a plurality of bolts 9.

However, there is a problem in the coupling structure of the hatch 10 thus constructed according to the prior art in that the hatch 10 cannot be easily dismantled due to its attachment by the plurality of bolts 9 in time of emergency such as overturn or submergence of a vehicle, making it difficult for passengers to escape therethrough.

SUMMARY OF THE INVENTION

The present invention is disclosed to solve the aforementioned problem and it is an object of the present invention to provide a vehicle hatch dismantling device adapted to fix a hatch to allow an opening at the roof to be opened and closed for ventilation in normal times and to enable an easy detachment of the hatch in emergency such as overturn or submergence of the vehicle, making it easy for passengers to escape through the opening at the roof of the vehicle.

In accordance with the object of the present invention, there is provided a vehicle hatch dismantling device having a hatch for covering an opening at the roof, a first bracket coupled to a panel underneath the hatch for vertical movement of the hatch and a toggle link mechanism secured to an area between an inner wall surface of the opening and a second bracket, the device comprising:

a plurality of clamping members coupled to the first bracket for coupling the first bracket to a lower panel of the hatch;

an intermittent fixing member slidably disposed at an upper side of the lower panel and coupled to a clamping member for releaseably mounting the hatch to the first bracket; and an insertion hole formed at the lower panel for allowing the clamping member to be inserted into the hatch therethrough.

BRIEF DESCRIPTION OF THE DRAWINGS

For fuller understanding of the nature and objects of the invention, reference should be made to the following detailed description taken in conjunction with the accompanying drawings in which:

FIG. 6a is a constitutional sectional view for illustrating an intermittent fixing member coupled intermittently according to the sectional view taken along line C—C of FIG. 5; and FIG. 6b is a constitutional sectional view for illustrating an intermittent fixing member released in coupling thereof according to the sectional view taken along line C—C of FIG. 5.

DETAILED DESCRIPTION OF THE INVENTION

Preferred embodiment of the present invention will now be described with reference to the accompanying drawings.

Figure 1:
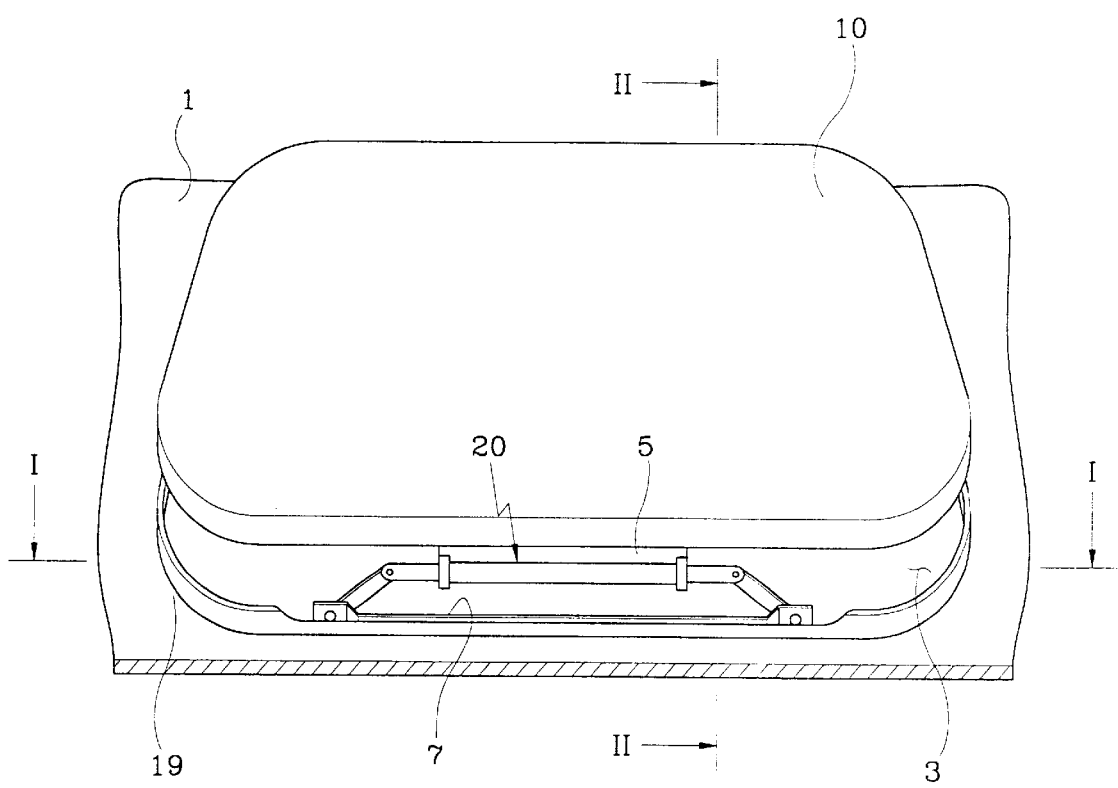
FIG. 1 is a schematic drawing for illustrating a hatch mounted at an opening of a vehicle roof according to the prior art.
Figure 2:
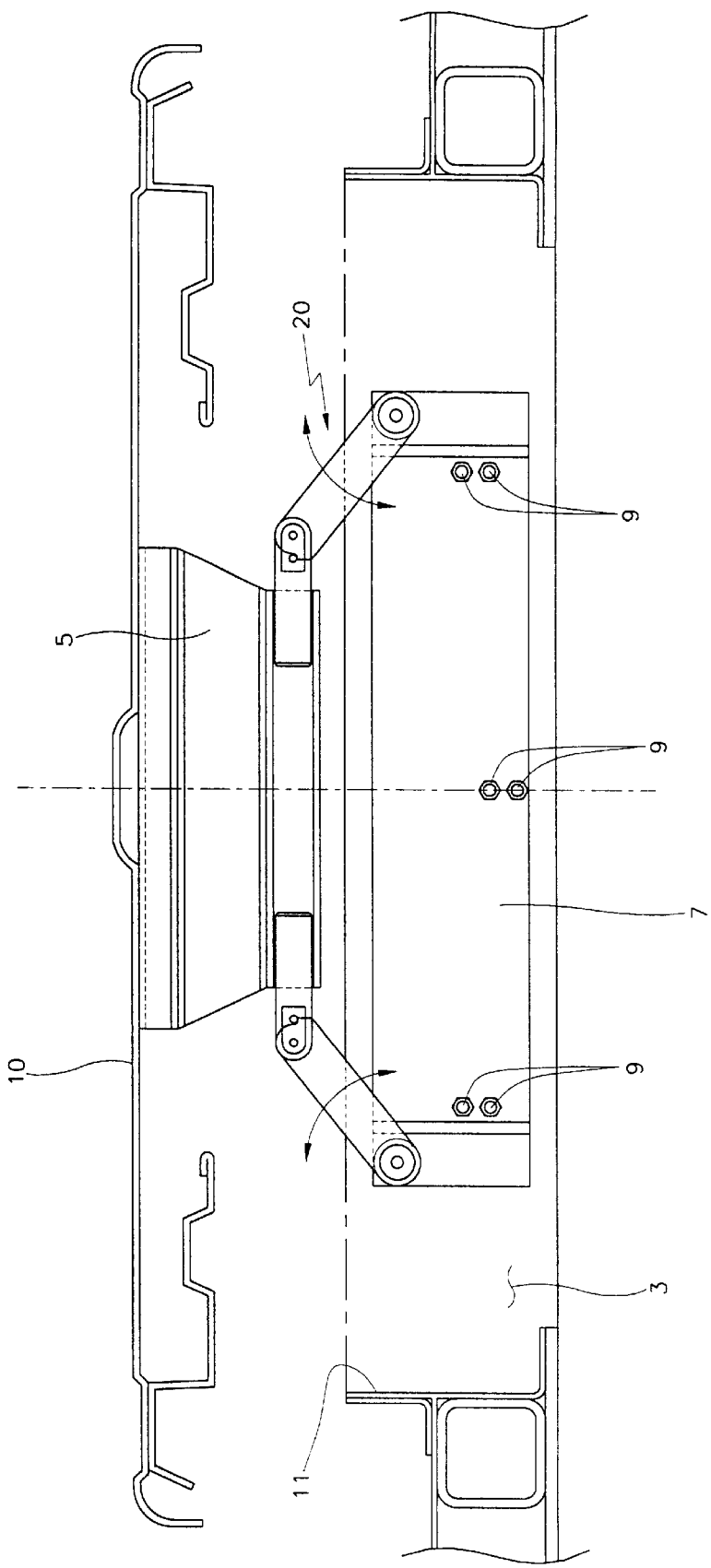
FIG. 2 is a sectional view taken along line I—I of FIG. 1.
Figure 3:
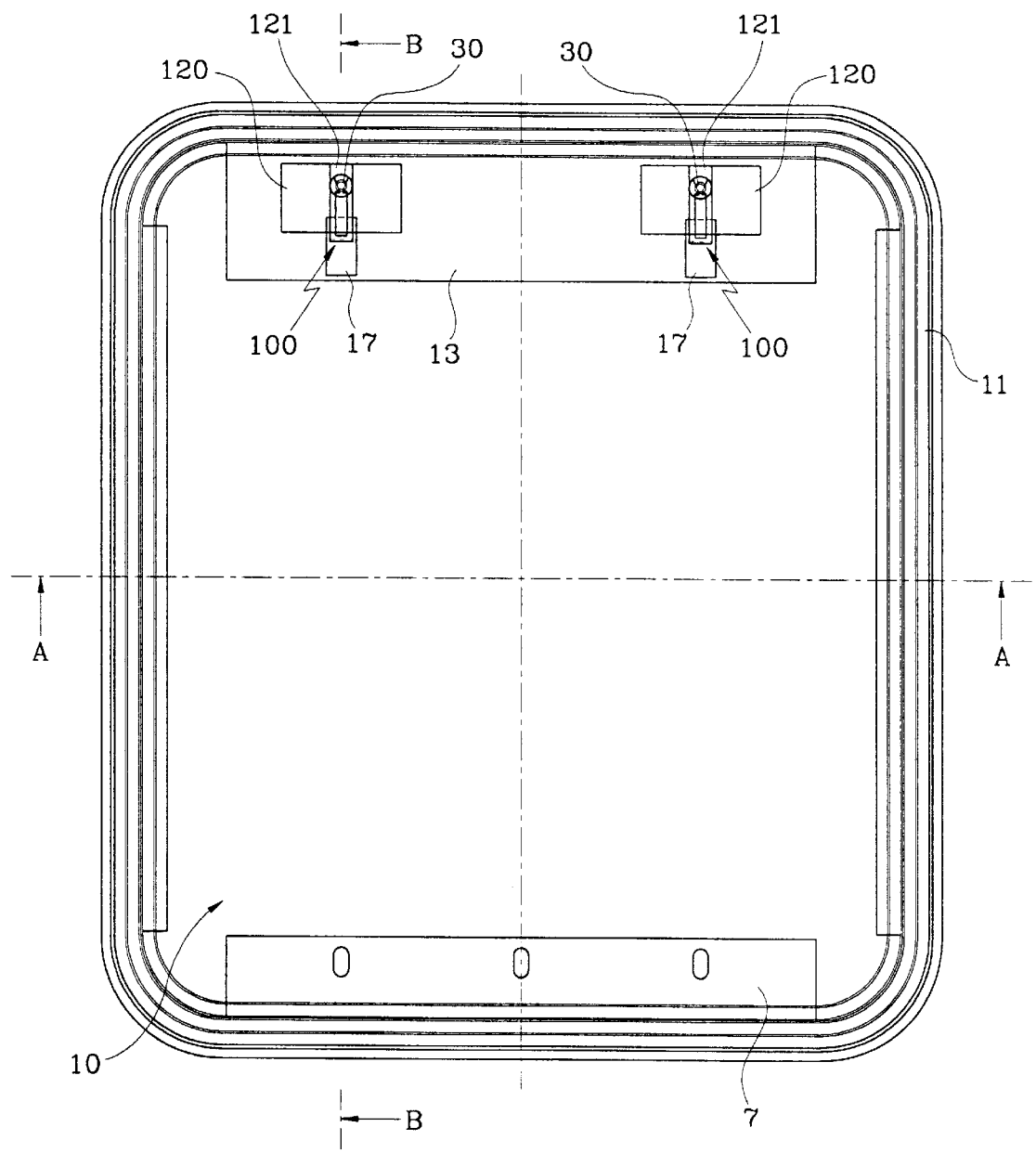
FIG. 3 is a schematic drawing for illustrating a hatch coupled in intermittent state according to the present invention.
Figure 4:
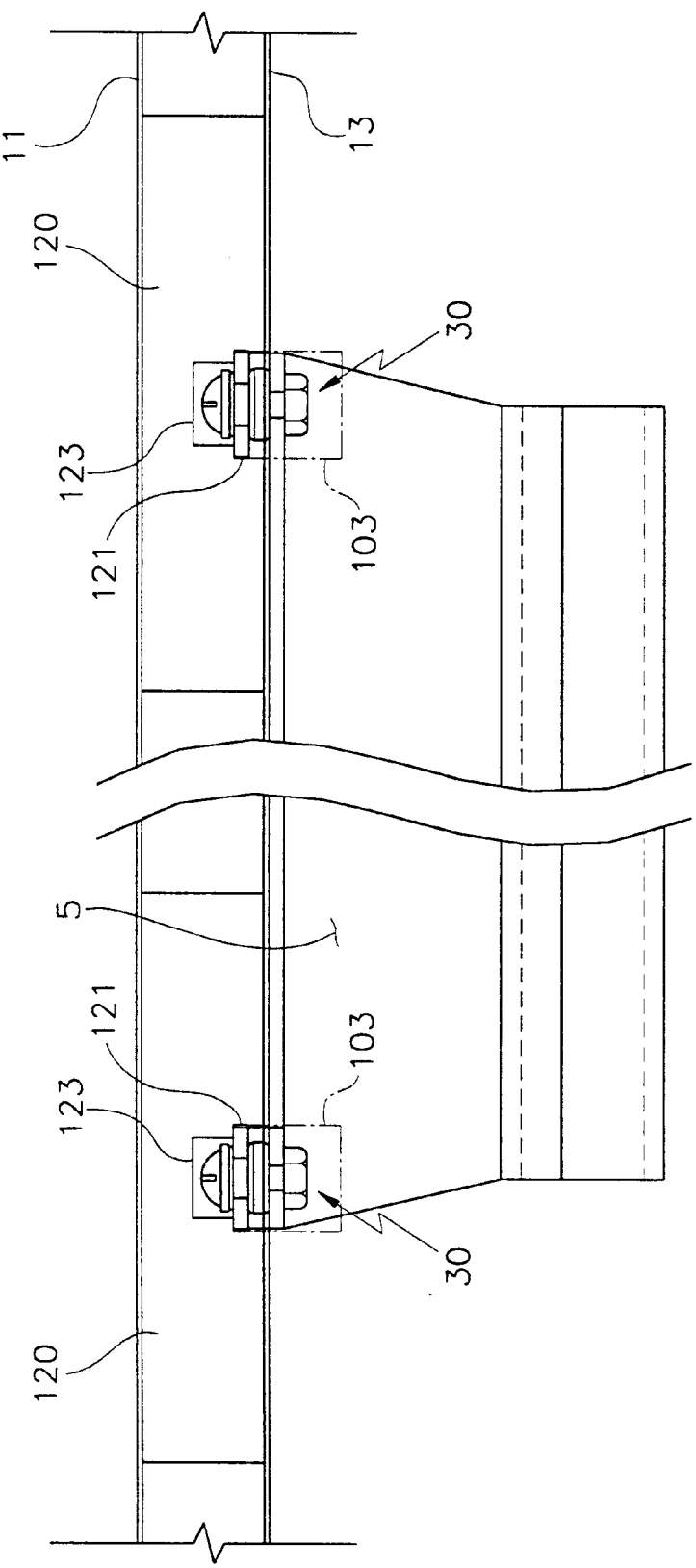
FIG. 4 is a sectional view taken along line A—A of FIG. 3.
Figure 5:
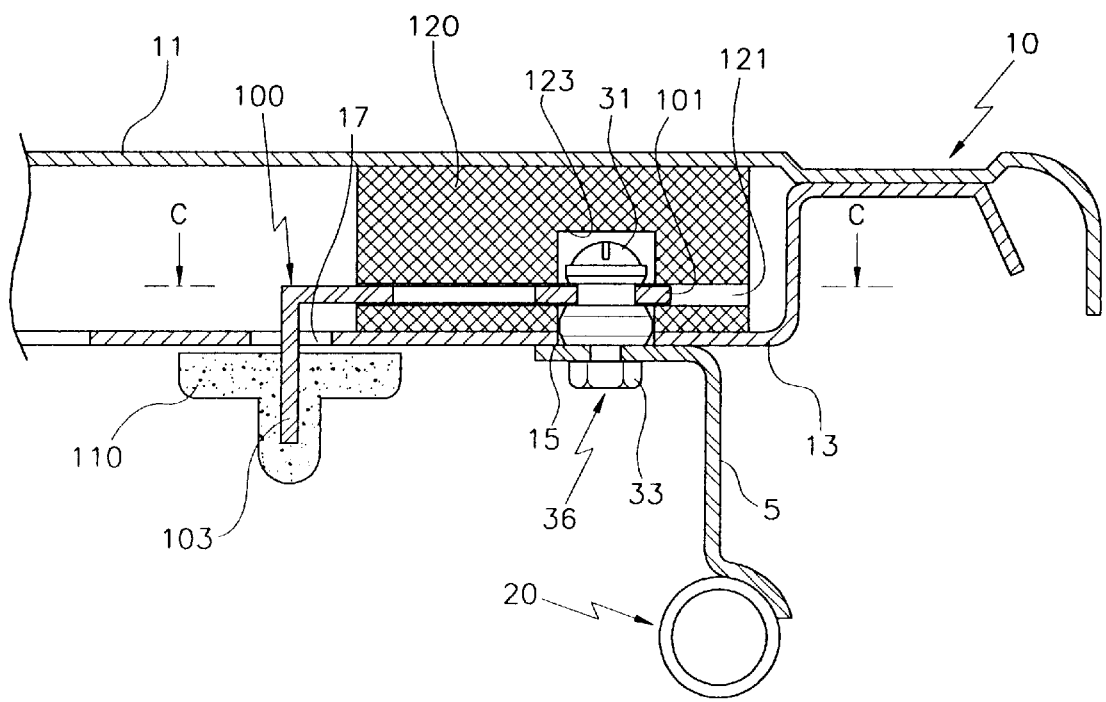
FIG. 5 is a sectional view taken along line B—B of FIG. 3.

FIG. 3 is a schematic drawing for illustrating a hatch intermittently coupled according to the present invention where like reference numerals are used for designation of like or equivalent parts or portions as in FIGS. 1 and 2.

The first bracket 5 connected to one side of the toggle link mechanism is coupled to a lower panel 13 of the hatch 10 by a clamping member 30 and the lower panel 13 is slidably arranged thereon with an intermittent fixing member 100.

Furthermore, the intermittent fixing member 100 is intermittently arranged between the clamping members in order to intermittently secure the first bracket 5 at the lower panel 13. The lower panel 13 is formed with an insertion hole 15 large enough for the clamping member 30 to pass through.

The intermittent fixing member 100 includes a fixation part 101 formed in fork to resiliently secure the clamping member 30, and a bend part 103 formed at one side of the fixation part 101 in bent fashion in order to pass through a through hole 17 formed at an interval from the insertion hole 15 arranged at the lower panel 13.

The forked fixation part 101 is formed at an end portion thereof with a hitching groove 105 for encompassing a peripheral surface of a body of the clamping member 30 at a predetermined angle and pressing same from both sides to allow the clamping member 30 to be hitchingly coupled in between the fixation parts 101. The bend part 103 of the intermittent fixing member 100 is attached with a handle 110 for easily moving the intermittent fixing member 100. Between upper panel 11 of the hatch 10 and the lower panel 13, there is arranged a guide member 120 for guiding the movement of the intermittent fixing member 100.

The guide member 120 longitudinally formed with a guide hole 121 for vertically and laterally guiding the movements of the fixation part 101 of the intermittent fixing member and at an approximate central portion of the guide member 120, is arranged an insertion hole 123 through which one side of the clamping member 130 is inserted.

Meanwhile, the intermittent fixing member 100 may be intermittently inserted between a lower side of nut 33 coupled to a bolt 31 and an upper surface of the lower panel 13. The nut 33 may be so constructed as to allow the nut 33 to be clamped by the bolt 31 while the guide member 120 is priorly inserted.

Now, operational effect of the present invention thus described will be described as below.

First of all, the first bracket 5 coupled with the toggle link mechanism 20 is joined by the clamping member 30 to complete the assembly. Successively, the clamping member 30 is inserted upward from under the lower panel 13 through the insertion hole 15 of the lower panel 13 in the assembled state. When the clamping member 30 is protruded upward of the lower panel 13, the fixation part 101 is fitted into the clamping member 30 to complete the coupling to encompass the body of clamping member 30.

At this time, when the fixation part 101 of the intermittent fixing member 100 is inserted into the guide hole of the guide member 120, the fixation part 101 is avoided from being widened to allow same to be securely coupled to the clamping member 30, by which hatch fixing operation of the intermittent fixing member 100 is completed as illustrated in FIG. 6*a*, thereby enabling the hatch 10 to vertically move through the toggle link mechanism 20 for opening and closing of the opening 3.

Meanwhile, when an emergency such as overturn or submergence of a vehicle occurs, passengers can escape from the vehicle by pulling the handle 110 toward inside direction of the hatch 10.

In other words, when an emergency happens, and even if the passengers face a situation of escaping from interior to exterior of a vehicle, the passengers can easily separate the hatch 10 by pulling the intermittent fixing member 100 to enable to escape from the vehicle through the opening 3.

As apparent from the foregoing, there is an advantage in the vehicle hatch dismantling device according to the present invention thus described in that the hatch is fixed to allow an opening at the roof to be opens and closed for ventilation in normal times and to enable an easy detachment of the hatch in emergency such as overturn or submergence of the vehicle, making it easy for passengers to escape through the opening at the roof of the vehicle.

What is claimed is:

1. A vehicle hatch dismantling device having a hatch for covering an opening at the roof, a first bracket coupled to a panel underneath the hatch for vertical movement of the hatch and a toggle link mechanism secured to an area between an inner wall surface of the opening and a second bracket, the device comprising:

a plurality of clamping members coupled to the first bracket for coupling the first bracket to a lower panel of a hatch;

an intermittent fixing member slidably disposed at an upper side of the lower panel and coupled to the clamping member for releaseably mounting the hatch to the first bracket; and an insertion hole formed at the lower panel for allowing the clamping member to be inserted into the hatch therethrough.

2. The device as defined in claim 1, wherein the intermittent fixing member comprises:

a fixation part formed in fork to resiliently secure the clamping member; and a bend part formed at one side of the fixation part in bent fashion in order to pass through a through hole formed at an interval from the insertion hole arranged at the lower panel.

3. The device as defined in claim 1, wherein the bend part of the intermittent fixing member is attached with a handle.

4. The device as defined in claim 1, wherein, a guide member for guiding the movement of the intermittent fixing member is arranged between the upper panel and lower panel of the hatch.

* * * * *